US012180027B2

(12) United States Patent
Wallman-Carlsson et al.

(10) Patent No.: US 12,180,027 B2
(45) Date of Patent: Dec. 31, 2024

(54) BANKNOTE STACK TRANSPORT ARRANGEMENT AND A CASH HANDLING MACHINE

(71) Applicant: Scan Coin AB, Malmö (SE)

(72) Inventors: Victor Wallman-Carlsson, Malmö (SE); Manfred Jönsson, Staffanstorp (SE)

(73) Assignee: Scan Coin AB, Malmö (SE)

(*) Notice: Subject to any disclaimer, the term of this patent is extended or adjusted under 35 U.S.C. 154(b) by 95 days.

(21) Appl. No.: 18/252,102

(22) PCT Filed: Nov. 11, 2021

(86) PCT No.: PCT/EP2021/081368
§ 371 (c)(1),
(2) Date: May 8, 2023

(87) PCT Pub. No.: WO2022/101335
PCT Pub. Date: May 19, 2022

(65) Prior Publication Data

US 2024/0010455 A1 Jan. 11, 2024

(30) Foreign Application Priority Data

Nov. 12, 2020 (EP) .................................... 20207124

(51) Int. Cl.
*B65H 31/30* (2006.01)
*B65H 29/40* (2006.01)
(Continued)

(52) U.S. Cl.
CPC ......... *B65H 31/3027* (2013.01); *B65H 29/40* (2013.01); *B65H 31/02* (2013.01);
(Continued)

(58) Field of Classification Search
CPC .... B65H 29/40; B65H 31/30; B65H 31/3027; B65H 31/3054; B65H 31/3072;
(Continued)

(56) References Cited

U.S. PATENT DOCUMENTS

| | | | |
|---|---|---|---|
| 9,437,067 | B2 | 9/2016 | Yin et al. |
| 9,677,309 | B2 | 6/2017 | Zhou et al. |

(Continued)

FOREIGN PATENT DOCUMENTS

| | | | |
|---|---|---|---|
| CL | 201500526 | A1 | 6/2015 |
| CL | 201503097 | A1 | 7/2016 |

(Continued)

*Primary Examiner* — Jeremy R Severson
(74) *Attorney, Agent, or Firm* — Capitol City TechLaw

(57) ABSTRACT

A banknote stack transport arrangement for a cash handling machine may include a first structure presenting a first banknote engagement portion that is displaceable in relation to the first structure, and a second structure presenting a second banknote engagement portion that is displaceable in relation to the second structure. At least one of the first and the second structures may be pivotally arranged at its first end so as to be swingably movable between a closed configuration and an open configuration. A movable banknote engager may be configured to press the banknote stack towards the first and/or the second banknote engagement portion. The banknote stack transport arrangement may be configured to transport the banknote stack out from a temporary banknote receptacle by displacing the first and the second banknote engagement portions and by moving the banknote engager to an active position.

15 Claims, 7 Drawing Sheets

(51) Int. Cl.
*B65H 31/02* (2006.01)
*G07D 11/14* (2019.01)
*G07D 11/16* (2019.01)

(52) U.S. Cl.
CPC ............. *G07D 11/14* (2019.01); *G07D 11/16* (2019.01); *B65H 2301/4213* (2013.01); *B65H 2301/4214* (2013.01); *B65H 2404/144* (2013.01); *B65H 2404/2614* (2013.01); *B65H 2404/2693* (2013.01); *B65H 2405/211* (2013.01); *B65H 2405/212* (2013.01); *B65H 2701/1912* (2013.01); *G07D 2211/00* (2013.01)

(58) Field of Classification Search
CPC .. B65H 2301/42132; B65H 2301/4213; B65H 2701/1912; G07D 11/14; G07D 11/16; G07D 2211/00
See application file for complete search history.

(56) References Cited

U.S. PATENT DOCUMENTS

| | | | | |
|---|---|---|---|---|
| 9,751,723 | B2 * | 9/2017 | Yu .......................... | B65H 29/40 |
| 9,873,583 | B2 | 1/2018 | Jin et al. | |

FOREIGN PATENT DOCUMENTS

| | | | |
|---|---|---|---|
| CL | 201600550 | A1 | 8/2016 |
| JP | 57014969 | A | 1/1982 |
| WO | 86/03868 | A1 | 7/1986 |
| WO | 2017/032256 | A1 | 3/2017 |

* cited by examiner

BANKNOTE STACK TRANSPORT ARRANGEMENT AND A CASH HANDLING MACHINE

This application claims priority under 35 USC 119 (a)-(d) from EP patent application No. 20207124.7 filed on Nov. 12, 2020, the entire contents of which are incorporated herein by reference.

FIELD OF THE DISCLOSURE

The present disclosure relates to a banknote stack transport arrangement and a cash handling machine comprising the same. The disclosure further relates to a method for transporting one or more banknotes inside a cash handling machine.

BACKGROUND ART

Banknote transport arrangements are known in the art. A common kind of banknote transport arrangement is used to transport banknotes one by one within cash handling machines such as ATM machines or the like. Another kind of banknote transport arrangement is capable of transporting complete stacks of banknotes. These kind of banknote transport arrangements are termed herein as banknote stack transport arrangements. A problem with banknote stack transport arrangements in the art is that they may sometimes lead to one or more banknotes not being transported together with the rest of the banknotes of the stack. The problem may occur e.g. due to the banknote stack being misaligned in the banknote stack transport arrangement and/or one or more banknotes of the stack being damaged e.g. by folds, tears, holes and foil wear. There is thus a need in the art for an improved banknote stack transport arrangement.

SUMMARY

It is an object to mitigate, alleviate or eliminate one or more of the above-identified deficiencies in the art and disadvantages singly or in any combination. These and other objects are at least partly met by the subject matter defined in the independent claims. Preferred embodiments are set out in the dependent claims.

According to a first aspect there is provided a banknote stack transport arrangement for a cash handling machine, comprising:

a first structure having first and second ends and presenting a first banknote engagement portion being displaceable in relation to the first structure;

a second structure having first and second ends and presenting a second banknote engagement portion being displaceable in relation to the second structure;

said first and second structures being arranged such that said first and second banknote engagement portions are distanced from each other at the first associated ends for allowing one or more banknotes to enter in between the banknote engagement portions, wherein at least one of the first and second structures is pivotally arranged at its first end so as to be swingably movable between:

a closed configuration at which the first and second banknote engagement portions are in contact with each other at the second associated ends such that they together form at least a bottom part of a temporary banknote receptacle configured to receive the one or more banknotes and support a formation of a banknote stack therein, such that the first banknote engagement portion contacts a face side of the banknote stack and the second banknote engagement portion contacts an edge side of the banknote stack; and an open configuration at which the first and second banknote engagement portions are separated from each other at the second associated ends so as to define an exit gap; and a banknote engager movable between an inactive position and an active position, at which active position the banknote engager is configured to press the banknote stack towards the first and/or the second banknote engagement portion;

wherein the banknote stack transport arrangement is configured to transport said banknote stack out from the temporary banknote receptacle via the exit gap by displacing said first and second banknote engagement portions in relation to said first and second structures and by moving the banknote engager to the active position.

The banknote stack transport arrangement may be advantageous as it allows stacking the banknotes before transporting them to a secondary location, such as e.g. a safe, within a cash handling machine. The stacking allows reducing the overall volume of the banknotes in the secondary location, which location hence could be made smaller and/or may be emptied less frequently. Furthermore, the banknote stack transport arrangement makes it easier to configure a cash handling machine for allowing a user to cancel a depositing operation. The banknote transport arrangement may be configured to hold the deposited banknotes in the temporary banknote receptacle and await a final confirmation from the user before transporting the banknotes to the secondary location, such as e.g. the safe.

The banknote stack transport arrangement may be advantageous as it allows for reducing the number of times one or more banknotes for various reasons cannot be transported by the banknote stack transport arrangement. There are several reasons why the banknote stack transport arrangement may be advantageous. Firstly, the banknote stack is supported from two sides by the first and second banknote engagement portions, respectively. As the first and second banknote engagement portions start to displace in relation to their associated structures, the banknote stack will have few, or no, non-moving obstacles in its way which could potentially block or jam the transport process. Secondly, the banknote engager may aid the transport of the banknote stack by pressing it towards one of, or both of, the two banknote engagement portions. This may be especially beneficial when there are few or even single banknotes in the stack and where one or more banknotes are damaged or twisted. The banknote engager will press the banknotes firmly towards one of, or both of, the banknote engagement portions, thereby reducing the risk of jam or blockage. The banknote stack transport arrangement may have a further advantage in that it provides a simplified design as compared to existing solutions in the art. Specifically, the first and second banknote engagement portions are capable of forming a receptacle, termed here as the temporary banknote receptacle, by their mere arrangement with respect to each other. No further parts are needed in this respect.

As readily appreciated by the person skilled in the art, displacing the first and second banknote engagement portions in relation to the first and second structures may be sufficient to transport the banknote stack out from the temporary banknote receptacle. The displacement will force the banknote stack towards a bottom of the temporary banknote receptacle (i.e. at the second associated ends of the first and second structures). The force from the banknotes will force the first and second structures such that they distance themselves from each other at their second associated ends, thereby forming the exit gap for allowing the banknote stack to leave the temporary banknote receptacle. There may however be situations where the displacement of the first and second banknote engagement portions is not enough for transporting the banknote stack out from the temporary banknote receptacle. Typically, such situations occur when the banknote stack includes few banknotes and/or the banknotes of the stack are not correctly aligned in the temporary banknote receptacle, and/or one or more banknotes of the banknote stack are damaged e.g. by folds, tears, holes and foil wear. For such situations, the banknote engager may aid in the transport process by pressing the banknote stack towards the first and/or the second banknote engagement portion, thereby reducing the risk that one or more banknotes of the banknote stack are prevented from being transported out from the temporary banknote receptacle.

The term "banknote stack transport arrangement" should be construed as one or more features within a cash handling machine which features together are capable of carrying out a transport of a banknote stack. The term should not be construed as limited only to a module or stand-alone device which e.g. could be readily inserted in the cash handling machine. In some cash handling machines, the banknote stack transport arrangement may instead form one of several parts of more extensive modules. In other cash handling machines, the banknote stack transport arrangement may be an integral part of the machine. As the term implies, the banknote stack transport arrangement is an arrangement for transporting banknote stacks, i.e. two or more banknotes which are stacked on top of each other face to face. However, as readily appreciated by the person skilled in the art, the banknote stack transport arrangement may also transport banknotes one by one in situations where only one banknote is provided to the banknote stack transport arrangement.

The first and second structures act as support structures for their associated banknote engagement portions. Said at least one of the first and second structures may be configured to move from the closed configuration to the open configuration in response to said displacing of said first and second surfaces in relation to said first and second structures.

The term "banknote engagement portion" should be construed as a portion of its associated structure which is displaceable in relation to said structure. As will be described in detail later, the banknote engagement portion may be embodied in different ways, e.g. by conveyor belts, rollers, or wheels. This implies that the term "banknote engagement portion" should be interpreted broadly. The banknote engagement portion may be defined by more than one element (such as e.g. a plurality of conveyor belts or a plurality of rollers) and/or may present more than one surface for contacting and supporting the banknote stack. The first and second banknote engagement portions may present first and second surfaces, respectively. The surfaces may be support and transport surfaces. The first and second surfaces may be planar, or substantially planar. The first and second banknote engagement portions may each be displaceable in relation to its associated structure along a displacement direction defined from the first end to the second end. The first and second banknote engagement portions may each extend, at least partly, between the first end and the second end of its associated structure. The first and second banknote engagement portions may form an oblique angle in between each other when the banknote stack transport arrangement is in the closed configuration. For some embodiments, the oblique angle is an acute angle. This implies that the bottom part of the temporary banknote receptacle may be V-shaped or substantially V-shaped. The first and second structures may be arranged in the cash handling machine such that their associated first ends are located above their associated second ends. This implies that the banknote stack may be transported out from the banknote stack transport arrangement along a downward or substantially downward direction.

It should be understood that banknotes come in different sizes and may be aligned in different ways in the banknote stack transport arrangement. Furthermore, banknote stacks come in different thicknesses dependent on the number of banknotes in the stack. Therefore the claim language "the first banknote engagement portion contacts a face side of the banknote stack" and "the second banknote engagement portion contacts an edge side of the banknote stack" should not be construed as ruling out the presence of further contact and support surfaces and/or elements of the banknote stack transport arrangement which, together with the first and second banknote engagement portions, provide support for the banknote stack. Specifically, the temporary banknote receptacle may comprise such further contact surfaces and/or elements for supporting the banknote stack.

The language "configured to press the banknote stack" should not be construed as limited to embodiments where the banknote engager is structured and arranged to, in an absence of banknotes in the temporary banknote receptacle, make contact with one of, or both of, the first and second banknote engagement portions. As readily appreciated by the person skilled in the art, a banknote stack may be pressed towards a banknote engagement portion even for embodiments where the banknote engager cannot make contact with a banknote engagement portion if only the dimensions of the banknote stack is sufficiently large. However, for preferred embodiments, the banknote engager is structured and arranged to, in an absence of banknotes in the temporary banknote receptacle, make contact with at least one of the first and second banknote engagement portions. Furthermore, the language "configured to press the banknote stack" implies that a distance between the banknote engager and the first and/or the second banknote engagement portions decreases as the banknote engager moves from the inactive position towards the active position. In other words, the banknote engager moves in a direction towards the first and/or the second banknote engagement portions during said movement from the inactive position towards the active position.

It should be understood that the banknote engager may be configured to press the banknote stack towards the first banknote engagement portion or towards the second banknote engagement portion or towards the first and second banknote engagement portions. This implies that the active position may be defined in relation to the first banknote engagement portion and/or in relation to the second banknote engagement portion dependent on the situation. A typical situation where the banknote engager may press the banknote stack towards the second banknote engagement portion is when one or more banknotes have been disorderly arranged in the temporary banknote receptacle such that they predominately rest on the second banknote engagement portion instead of the first banknote engagement portion. By allowing the banknote engager to press the banknote stack towards the second banknote engagement portion, it may be easier to transport the one or more banknotes out from the temporary banknote receptacle. For some embodiments the banknote engager is configured to press the banknote stack towards the first banknote engagement portion only. For some embodiments the banknote engager is configured to press the banknote stack towards the second banknote engagement portion only.

According to some embodiments, the banknote stack transport arrangement is configured to transport said banknote stack out from the temporary banknote receptacle via the exit gap in one displacement operation. This may be advantageous as it provides an efficient transport operation of the banknote stack. In most situations, one operation is enough for transporting the banknote stack out from the temporary banknote receptacle. This implies that it may be sufficient to provide one displacement operation of the first and second banknote engagement portions to completely empty the temporary banknote receptacle. However, there may be situations where one operation is not enough. For such situations, the banknote stack transport arrangement may be configured to perform other actions, such as but not limited to: stop displacing the first and second banknote engagement portions, moving the banknote engager to the active position, and displacing the first and second banknote engagement portions in a reverse direction.

According to some embodiments, the second structure is fixedly arranged in the banknote transport arrangement. This may be advantageous for several reasons. Firstly, the arrangement can be made less complex. Secondly, by allowing the first structure to be movable, the banknote engager will exert pressure in substantially the same direction as the direction in which the first structure will swingably move when commencing a transport operation of a banknote stack out from the temporary banknote receptacle.

According to some embodiments, each of the first and second banknote engagement portions are defined by one or more conveyor belts. This may be advantageous as it may provide a relatively large surface area available for contacting the banknote stack. Having a relatively large surface area allows for a more reliable transport of the banknote stack, because the risk of the banknote engagement portions losing fixed contact with the banknote stack, i.e. starts to slip, is reduced. A further advantage of using conveyor belts may be that conveyor belts typically are made from materials having high friction properties, thus further reducing the risk of slipping.

There are other ways of designing the banknote engagement portions. For example, each of the first and second banknote engagement portions may be defined by one or more rollers. It is also conceivable that said portions are defined by one or more wheels or one or more chains.

According to some embodiments, the first and second structures are biased towards each other to the closed configuration. This may be advantageous because it allows the at least one of the first and second structures to move from the closed configuration to the open configuration passively as a result from the displaced banknote stack forcing the opening of the exit gap by its own displacement. Thus, for these embodiments, no active drive mechanism will be needed to move the at least one of the first and second structures from the closed configuration to the open configuration.

According to some embodiments, the banknote engager extends from a fixed end at which the banknote engager is pivotally arranged, to a free end which presents an engaging surface configured to be in contact with the banknote stack for pressing the banknote stack towards the first and/or the second banknote engagement portion when the banknote engager is in the active position. This may be advantageous, because it allows the banknote engager to be operated by a rotational motion, which may allow a simplified drive mechanism. Moreover, the pivotally arranged banknote engager may be easier to arrange in the banknote stack transport arrangement, as the fixed end will be located at some distance from the first and second structures. The banknote engager may be swingably movable between the inactive and active positions. The banknote engager may be pivotally arranged at the fixed end along a pivot axis.

According to some embodiments, the banknote engager comprises one or more engaging elements arranged at the free end, wherein said one or more engaging elements together define said engaging surface. The one or more engaging elements may comprise one or more rollers. Alternatively, or additionally, the one or more engaging elements may comprise one or more wheels.

According to some embodiments, the banknote stack transport arrangement is configured to:

initiate said displacing of said first and second banknote engagement portions at a first time position, and initiate said moving of the banknote engager at a second time position, wherein said first and second time positions relate to each other such that said displacing of said first and second banknote engagement portions has been ongoing for a time period when the banknote engager reaches the active position.

This may be advantageous as it allows transporting the banknote stack without using the banknote engager for those situations where this works perfectly and efficiently. One example of such a situation is an orderly stacked banknote stack including undamaged and/or planar banknotes. For such situations, the banknote engager may potentially complicate the transport process instead of aiding it, and it may therefore be more efficient to not make use of it. By allowing the banknote engager to arrive at the active position after a predetermined time period, the displacement operation commenced by the first and second banknote engagement portions will first have a chance to attempt transporting the banknote stack on its own. If the transport process is not successful within the time period, the banknote engager will arrive at the active position and aid with the transport.

According to some embodiments, the banknote transport arrangement further comprises a drive unit configured to, via a drive mechanism, provide kinetic energy to the first and second structures for displacing said first and second banknote engagement portions.

According to some embodiments, the drive unit is further configured to, via the drive mechanism, move the banknote engager between the inactive and active positions.

Providing a drive mechanism that controls both the displacement of the first and second banknote engagement portions and the movement of the banknote engager may simplify the banknote stack transport arrangement. Moreover, it allows for using a single drive unit for both the portion displacement and the engager movement.

According to some embodiments, the drive unit is an electric motor.

According to some embodiments, the drive mechanism is configured such that kinetic energy is provided to the first and second banknote engagement portions only for one rotational direction of the drive unit, such that said first and second banknote engagement portions are only displaceable in a direction towards the exit gap.

This may be advantageous as it removes the risk of accidentally displacing the first and second banknote engagement portions in a direction opposite to the intended direction. If the first and second banknote engagement portions suddenly were to be displaced in the opposite direction, the banknote stack may break up into individual banknotes inside the temporary banknote receptacle, increasing the risk of jam. Furthermore, for these embodiments, the drive unit may be allowed to operate along both rotational directions without risking causing displacement in the opposite direction. One way to configure the drive mechanism such that kinetic energy is provided to the first and second banknote engagement portions only for one rotational direction of the drive unit is by using one or more one-way clutch bearings in the drive mechanism. Such clutch bearings will transfer kinetic energy supplied to the clutch bearing along a predefined rotational direction whereas it will not transfer any kinetic energy supplied to the clutch bearing along a rotational direction being opposite to the predefined rotational direction.

According to some embodiments, the drive unit is configured to be operated along a forward rotational direction for moving the banknote engager from the inactive to the active position, and a reverse rotational direction for moving the banknote engager from the active to the inactive position. The drive mechanism may be configured such that the drive unit operates in the forward direction when the banknote engager is located in the active position. This may be achieved by using one or more slip clutches or torque limiters in the drive mechanism. Such components allow mechanical coupling between the drive unit and the banknote engager as long as the torque supplied by the drive unit does not exceed a maximum threshold value. If the torque exceeds the maximum threshold value, the component either mechanically uncouples the drive mechanism from the banknote engager or limits the torque by slipping. For the example embodiments, the latter alternative is preferably used. In other words, the drive mechanism may be configured to exert a torque to the banknote engager when the banknote engager is in the active position and the drive unit is operated in the forward direction. This achieves the effect that the banknote engager may press the banknote stack towards the first and/or the second banknote engagement portion.

According to some embodiments, the banknote transport arrangement further comprises a banknote stacking wheel configured to receive the one or more banknotes, move the one or more banknotes into the temporary banknote receptacle, and form a banknote stack therein.

According to a second aspect there is provided a cash handling machine comprising:

- a banknote input unit for allowing a user to input one or more banknotes;
- a safe for storing said one or more banknotes; and a banknote stack transport arrangement according to the first aspect;
- wherein the banknote transport arrangement is configured to receive said one or more banknotes and transport the same into the safe.

According to a third aspect there is provided a method for transporting one or more banknotes inside a cash handling machine, wherein said cash handling machine comprises:

- a first structure having first and second ends and presenting a first banknote engagement portion being displaceable in relation to the first structure;
- a second structure having first and second ends and presenting a second banknote engagement portion being displaceable in relation to the second structure;
- said first and second structures being arranged such that said first and second banknote engagement portions are distanced from each other at the first associated ends for allowing one or more banknotes to enter in between the portions, wherein at least one of the first and second structures is pivotally arranged at its first end so as to be swingably movable, said method comprising:

- receiving, when said at least one of the first and second structures is in a closed configuration at which the first and second banknote engagement portions are in contact with each other at the second associated ends so as to form at least a bottom part of a temporary banknote receptacle, one or more banknotes in the temporary banknote receptacle and supporting a formation of a banknote stack therein such that the first banknote engagement portion contacts a face side of the banknote stack and the second banknote engagement portion contacts an edge side of the banknote stack;
- moving a banknote engager of the cash handling machine to an active position at which the banknote engager is configured to press the banknote stack towards the first and/or the second banknote engagement portion, and
- displacing said first and second banknote engagement portions in relation to said first and second structures so as to transport, when said at least one of the first and second structures is in an open configuration at which the first and second banknote engagement portions are separated from each other at the second associated ends so as to define an exit gap, said banknote stack out from the temporary banknote receptacle via the exit gap.

According to some embodiments, the step of displacing said first and second banknote engagement portions is initiated at a first time position, and wherein the step of moving the banknote engager is initiated at a second time position,

- wherein said first and second time positions relate to each other such that said displacing of said first and second banknote engagement portions has been ongoing for a time period when the banknote engager reaches the active position.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles “a”, “an”, “the”, and “said” are intended to mean that there are one or more of the elements unless the context clearly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTIONS OF THE DRAWINGS

The disclosure will by way of example be described in more detail with reference to the appended drawings, which shows presently preferred embodiments of the disclosure.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

FIG. 1 shows a banknote stack transport arrangement 100 according to an example embodiment. The banknote stack transport arrangement 100 is typically used inside a cash handling machine of the kind handling large amounts of banknotes. The banknote stack transport arrangement 100 may be specifically advantageous to use within a cash handling machine used for depositing cash. Such a machine will be further described later.

The banknote stack transport arrangement 100 will here first be described with reference to FIGS. 1A-D in terms of its structural features, whereas its function will be described more in detail later with references to FIGS. 2-5.

Figure 1A:
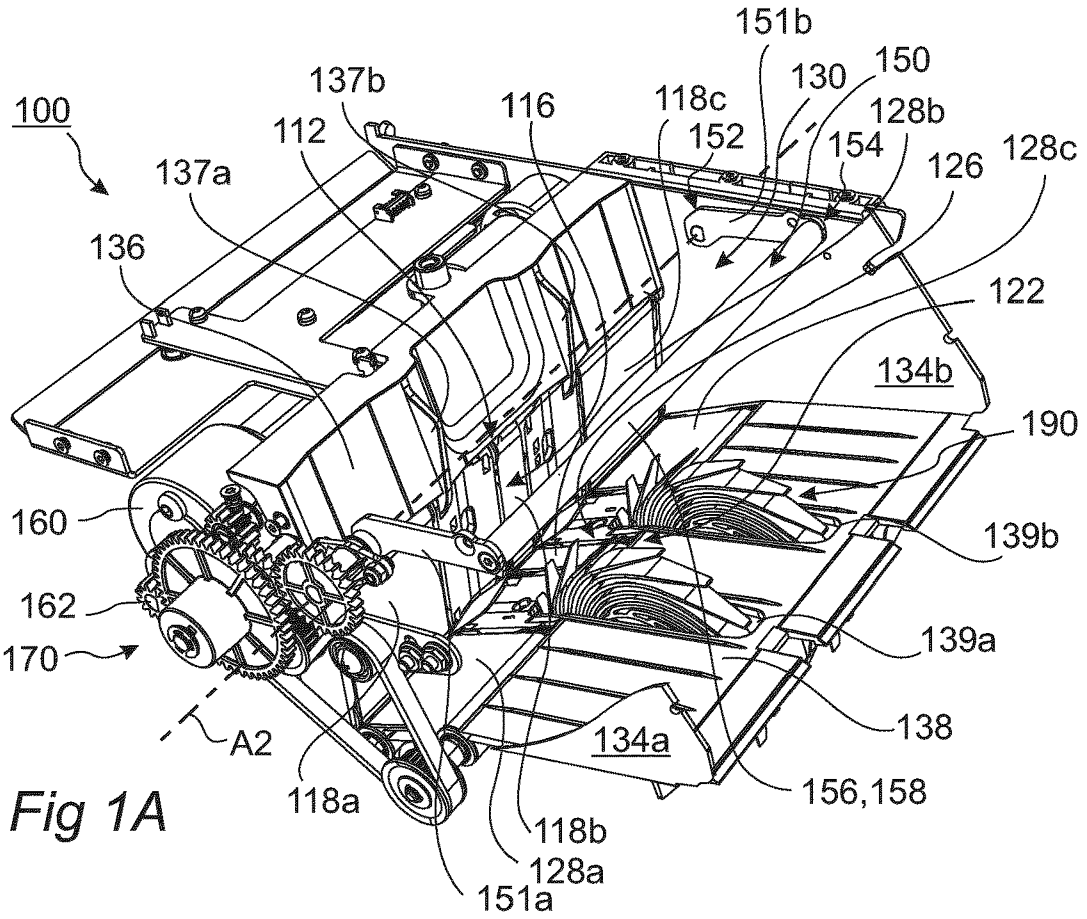
FIG. 1A shows a perspective top view of a banknote stack transport arrangement according to an embodiment of the present disclosure.
Figure 1B:
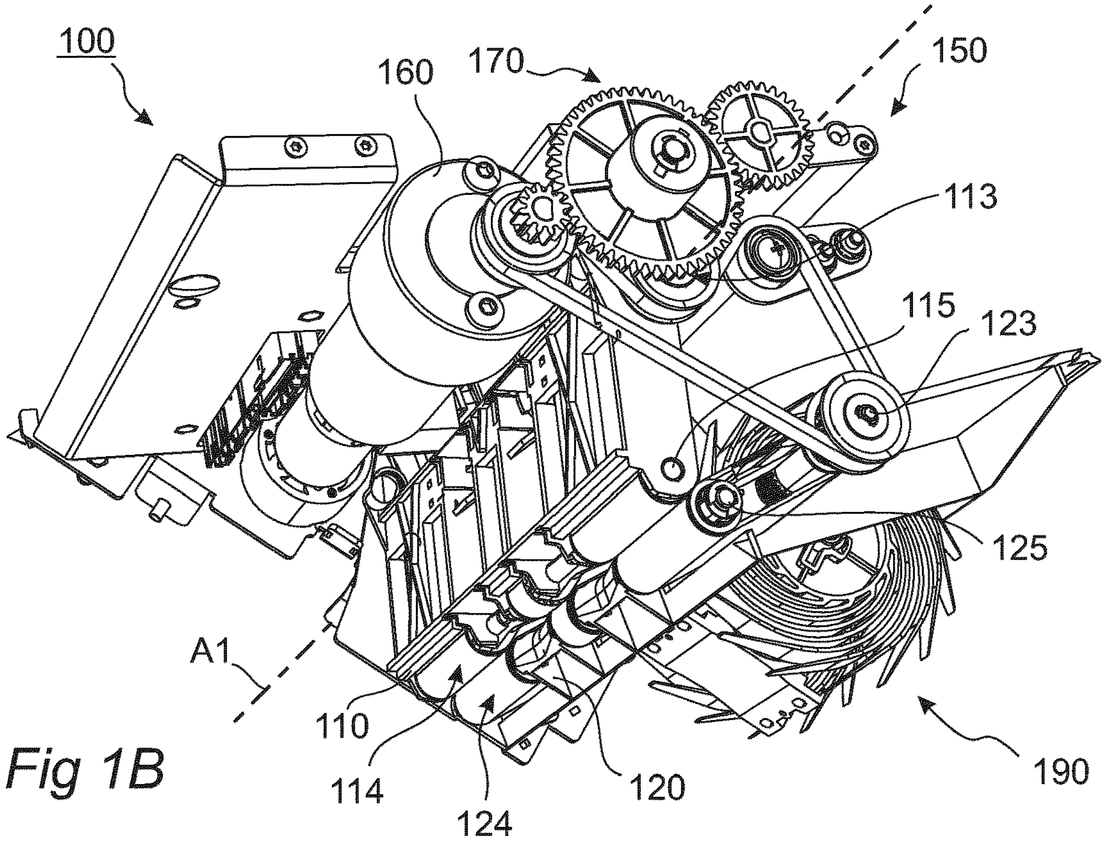
FIG. 1B shows a perspective bottom view of the banknote stack transport arrangement of FIG. 1A.

As illustrated in FIGS. 1A and B, the banknote stack transport arrangement 100 comprises a first structure 110 having first 112 and second 114 ends. The first structure 110 comprises a first shaft 113 arranged at the first end 112 and a second shaft 115 arranged at the second end 114. The first shaft 113 is rotationally arranged in the first structure 110. One or more conveyor belts 118*a*-*c* extend between the first 113 and second 115 shafts. In the example embodiment, three conveyor belts are used. Conveyor belt 118*b* is located in the central part of the first structure 110, whereas conveyor belts 118*a* and 118*c* are located in vicinity of side walls 134*a*, 134*b* which interconnects the first 110 and second 120 structure. In several of the Figures, side wall 134*a* has been partly or entirely removed to make it possible to see the interior of the arrangement.

The one or more conveyor belts 118*a*-*c* together presents a first banknote engagement portion 116 which is displaceable in relation to the first structure 110. The purpose of the first banknote engagement portion 116 is to provide support for a banknote stack 30 as will be described more in detail later. The first structure 110 is pivotally arranged at its first end 112 so as to be swingably movable around pivot axis A1 (see FIG. 1B and most clearly in FIG. 3). The first structure 110 is movable between a closed configuration C1 and an open configuration C2. In the closed configuration C1, which is illustrated in FIGS. 1A and B, the first 116 and second 126 banknote engagement portions are in contact with each other at the second associated ends 114, 124 such that they together form a bottom part of a temporary banknote receptacle 130. As will be further described later, the temporary banknote receptacle 130 is configured to receive one or more banknotes 20 and support a formation of a banknote stack 30 therein.

The banknote stack transport arrangement 100 further comprises a second structure 120 having first 122 and second 124 ends. The second structure 120 comprises a first shaft 123 arranged at the first end 122 and a second shaft 125 arranged at the second end 124. The first shaft 123 is rotationally arranged in the second structure 120. One or more conveyor belts 128*a*-*c* extend between the first 123 and second 125 shafts. In the example embodiment, three conveyor belts are used. Conveyor belt 128*b* is located in the central part of the second structure 120, whereas conveyor belts 128*a* and 128*c* are located in vicinity of side walls 134*a*, 134*b*. The one or more conveyor belts 128*a*-*c* together presents a second banknote engagement portion 126 which is displaceable in relation to the second structure 120. The purpose of the second banknote engagement portion 126 is to provide support for a banknote stack 30 as will be described in more detail later. For the example embodiment, the second structure 120 is fixedly arranged in the banknote transport arrangement 100. The first 110 and second 120 structures are arranged such that said first 116 and second 126 banknote engagement portions are distanced from each other at the first associated ends 112, 122 for allowing one or more banknotes 20 to enter in between the banknote engagement portions 116, 126. The first 110 and second 120 structures are biased towards each other to the closed configuration C1. In the example embodiment the biasing is achieved by means of a coil spring (not shown) arranged at the pivot axis A1.

As can be seen in FIGS. 1A and B, the temporary banknote receptacle 130 of the example embodiment extends beyond the first 110 and second 120 structures and is consequently defined by further features. These include already mentioned side walls 134*a*,134*b*, first upper support structure 136 and second upper support structure 138. When the first structure 110 is in the closed configuration C1, the first upper support structure 136 is slightly angled with respect to the first banknote engagement portion 116 of the first structure 110 and presents two protrusions 137*a*, 137*b* which, together with the first banknote engagement portion 116, presents an interface for supporting a banknote stack 30. The second upper support structure 138 presents two elongate openings 139*a*, 139*b* trough which a banknote stacking wheel 190 protrudes from below. The banknote stacking wheel 190 is configured to receive one or more banknotes 20, move the one or more banknotes 20 into the temporary banknote receptacle and form a banknote stack 30 therein.

The banknote stack transport arrangement 100 further comprises a banknote engager 150. The banknote engager 150 is movable between an inactive position P1 and an active position P2. As will be described in detail later, in the active position P2 the banknote engager 150 is configured to press the banknote stack 30 towards the first banknote engagement portion 116. In FIGS. 1A and B, the banknote engager 150 is located in the inactive position P1. The banknote engager 150 extends from a fixed end 152 at which the banknote engager 150 is pivotally arranged, to a free end 154. The banknote engager 150 is pivotally arranged in the banknote stack transport arrangement 100 along pivot axis A2 (see FIG. 1A). At one of its sides, the banknote engager 150 is pivotally arranged by means of a banknote engager shaft 155 (see FIGS. 1C and D) which protrudes out through side wall 134*a* to couple to a drive mechanism as will be further described later. In the example embodiment, the banknote engager 150 comprises side arms 151*a*, 151*b* which extend between the fixed end 152 and the free end 154. Engaging element 156 extends between the side arms 151*a*, 151*b* at the free end 154. The engaging element 156 presents an engaging surface 158 which is configured to be in contact with a banknote stack 30 for pressing said banknote stack 30 towards the first and/or the second banknote engagement portion 116 when the banknote engager is in the active position P2.

The banknote stack transport arrangement 100 further comprises a drive unit 160 configured to, via a drive mechanism 170, provide kinetic energy to the first 110 and second 120 structures for displacing the first 116 and second 126 banknote engagement portions. Although illustrated in FIGS. 1A and B, the drive unit 160 and the drive mechanism 170 is most clearly illustrated in FIGS. 1C and D.

The drive mechanism 170 comprises two separate transmission lines: a first transmission line 171 configured to supply kinetic energy from the drive unit 160 to the first 116 and second 126 banknote engagement portions (i.e. to one or more conveyor belts 118*a-c* and 128*a-c*), and a second transmission line 180 configured to supply kinetic energy from the drive unit 160 to the banknote engager 150. The drive unit 160 of the example embodiment is an electric motor. The drive unit 160 comprises a drive shaft 162 which carries both drive pulley 172, which forms a part of the first transmission line 171, and drive gear 181, which forms a part of the second transmission line 180.

The first transmission line 171 is most clearly illustrated in FIG. 1D and operates as follows: As the drive unit 160 rotates the drive shaft 162 in the counter clockwise direction, as illustrated in FIG. 1D, the drive pulley 172 forces the drive belt 177 to move along with it. The drive belt 177 connects with three other pulleys: a first banknote engagement portion pulley 173 which is attached to the first shaft 113 of the first structure 110, a second banknote engagement portion pulley 174 which is attached to the first shaft 123 of the second structure 120, and a biasing pulley 175, which is disposed in between the first 173 and 174 second banknote engagement portion pulleys. As clearly illustrated in FIG. 1D, the counter clockwise rotation of the drive unit 160 will make the first banknote engagement portion pulley 173 rotate in the clockwise direction and the second banknote engagement portion pulley 174 to rotate in the counter clockwise direction. As readily appreciated by the person skilled in the art, this will allow both of the two banknote engagement portions 116, 126 to be displaced in a direction from the first associated ends 112, 122 to the second associated ends 114, 124. The biasing pulley 175 is arranged at a movable end of a lever 176 which is swingably attached to the banknote stack transport arrangement 100 at a pivot point 178. The lever 176 is secured to side wall 134*a* to prevent rotation thereof by means of screw 188. This allows for keeping the tension of the drive belt 177 to avoid slipping.

The second transmission line 180 is most clearly illustrated in FIGS. 1C and D and operates as follows: As the drive unit 160 rotates the drive shaft 162 in the counter clockwise direction, as illustrated in FIG. 1D, the drive gear 181 engages large-diameter transmission gear 183 and forces the same to rotate in the clockwise direction. The transmission gear 183 is rotationally arranged on a first transmission shaft 182 which is fixedly arranged in the banknote stack transport arrangement 100. Also rotationally arranged on the first transmission shaft 182, and coupled to the transmission gear 183 (see more details on said coupling later), is small-diameter transmission gear 184. The transmission gear 184 engages transmission gear 187 which is rotationally arranged on second transmission shaft 186, which in turn is fixedly arranged in the banknote stack transport arrangement 100. Finally, the transmission gear 187 engages banknote engager gear 189 which is attached to the banknote engager shaft 155. As readily appreciated by the person skilled in the art, a rotation in the counter clockwise direction of drive unit 160 will result in a rotation in the clockwise direction of the banknote engager gear 189. As evident from FIGS. 1A and B, such a clockwise rotation will move the banknote engager 150 from the inactive position P1 to the active position P2.

In order for the drive unit 160 and drive mechanism 170 to control both the first 116 and second 126 banknote engagement portions and the banknote engager 150 to satisfaction, two further kind of mechanical components are used.

The first kind of such components are one-way clutch bearings 173*a* and 174*a* which form parts of the first transmission line 171 of the drive mechanism 170. As illustrated in FIG. 1D, the one-way clutch bearing 173*a* is arranged between the first shaft 113 of the first structure 110 and the first banknote engagement portion pulley 173, whereas the one-way clutch bearing 174*a* is arranged between the first shaft 123 of the second structure 120 and the second banknote engagement portion pulley 174. The one-way clutch bearings 173*a*, 174*a* allows for controlling the rotational direction of the first 173 and second 174 banknote engagement portion pulleys and hence the displacement of the first 116 and second 126 banknote engagement portions. The one-way clutch bearing 173*a* is arranged with respect to the first shaft 113 of the first structure 110 and/or first banknote engagement portion pulley 173 such that only the rotation in the clockwise direction enables transfer of kinetic energy to the first shaft 113 of the first structure 110. The one-way clutch bearing 174*a* is arranged with respect to the first shaft 123 of the second structure 120 and/or second banknote engagement portion pulley 174 such that only the rotation in the counter clockwise direction enables transfer of kinetic energy to the first shaft 123 of the second structure 120. In other words, if the drive unit 160 were to be rotated in reverse, i.e. in the clockwise direction, the first 173 and second 174 banknote engagement portion pulleys would not be able to rotate the first associated shafts 113, 123 of the structures 110, 120. This way, it is ensured that the first 116 and second 126 banknote engagement portions are never displaced in a direction extending from the second associated ends 114, 124 towards the first associated ends 112, 122. Such a displacement is generally unwanted, because a banknote stack 30 residing in the temporary banknote receptacle 130 will be displaced upwardly in the temporary banknote receptacle 130, which increases the risk of the banknote stack 30 breaking apart and individual banknotes 20 of the banknote stack 30 getting jammed in the banknote stack transport arrangement 100.

Figure 1C:
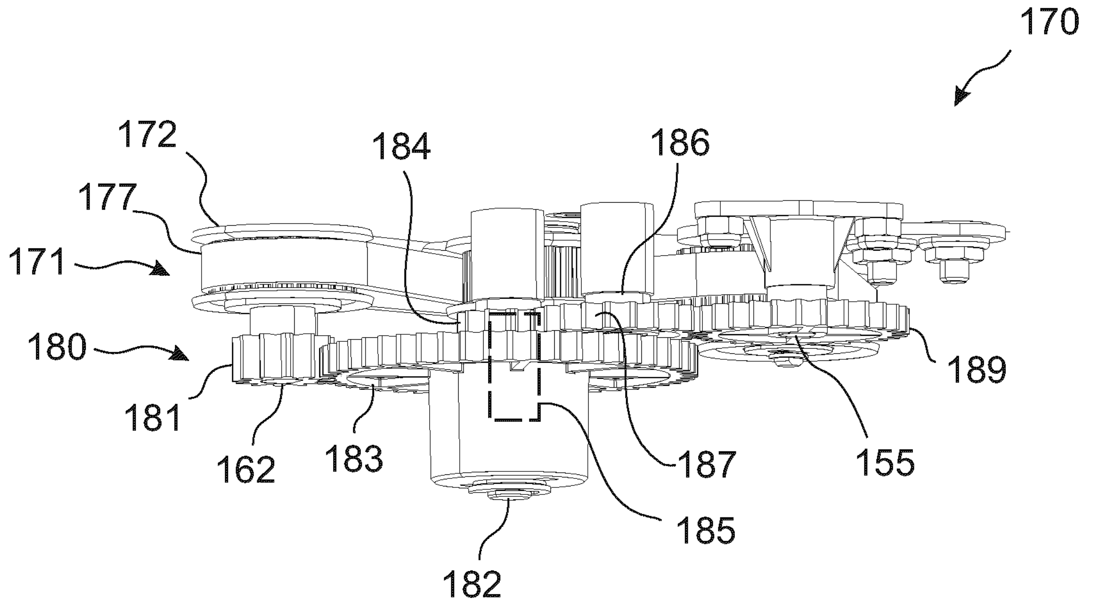
FIG. 1C shows a top view of a drive mechanism of the banknote stack transport arrangement of FIG. 1A.
Figure 1D:
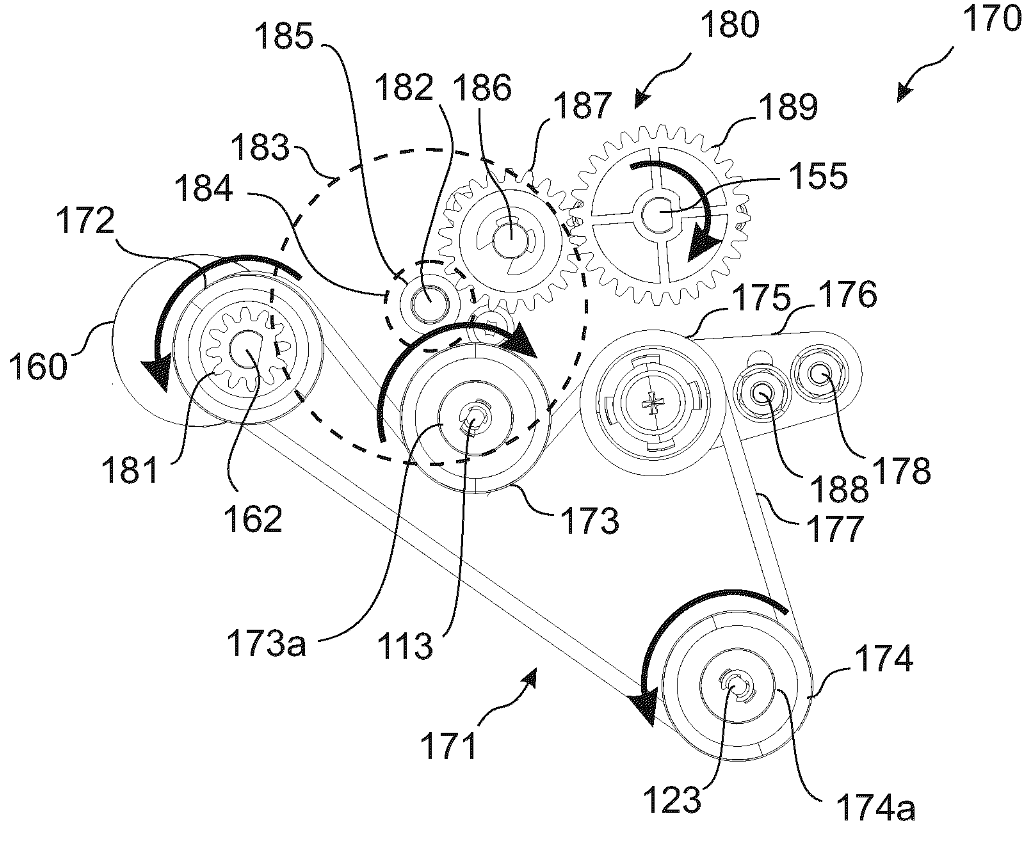
FIG. 1D shows a side view of the drive mechanism of FIG. 1C.

The second of these further components is a slip clutch 185 which is arranged between the transmission gear 183 and transmission gear 184 as is schematically illustrated in FIG. 1C. The slip clutch 185 allow mechanical coupling between the transmission gear 183 and the transmission gear 184 as long as the torque supplied by transmission gear 183 does not exceed a maximum threshold value. If the torque exceeds the maximum threshold value, the slip clutch 185 will limit the torque by slipping. As readily appreciated by the person skilled in the art, this has the consequence that the rest of the second transmission line 180 and the banknote engager 150 which is connected to the end of the transmission line 180, will not move even if the drive unit 160 rotates the transmission gear 183. By using the slip clutch 185, it is possible to continue operating the drive unit 160 in the counter clockwise direction as illustrated in FIG. 1D and thereby continuing displacing the first 116 and second 126 banknote engagement portions even if the banknote engager 150 has reached the active position P2. At the active position P2, the slip clutch 185 will allow for the banknote engager 150 to supply a force in the direction of the first banknote engagement portion 116 as long as the drive unit 160 is in operation.

Having described the structural features of the banknote stack transport arrangement 100 in detail with reference to FIGS. 1A-D, it is now time to describe how the banknote stack transport arrangement 100 handles a transport of a banknote stack 30. This will be done with reference to FIGS. 2-5 which illustrates the banknote stack transport arrangement 100 in different phases of the transport process.

Figure 2:
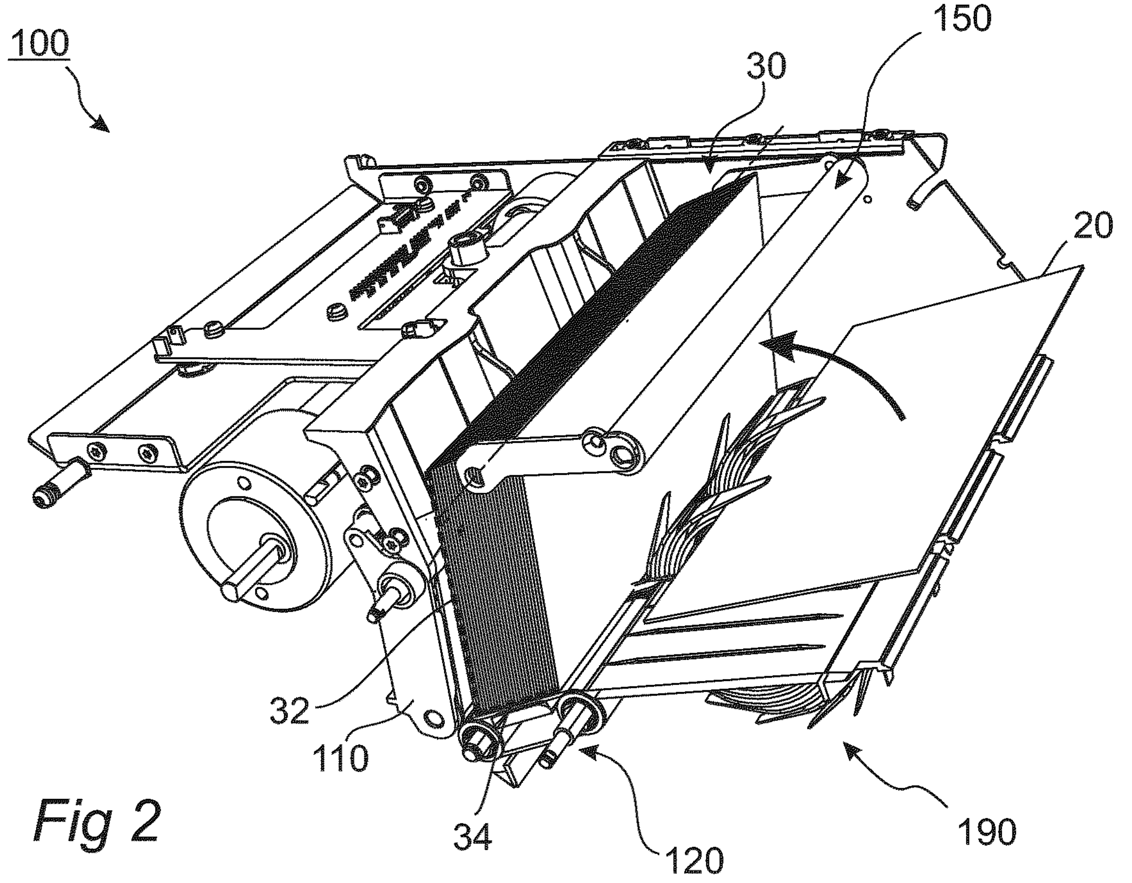
FIG. 2 shows a perspective top view of the banknote stack transport arrangement of FIG. 1A during the process of stacking banknotes therein.
Figure 3:
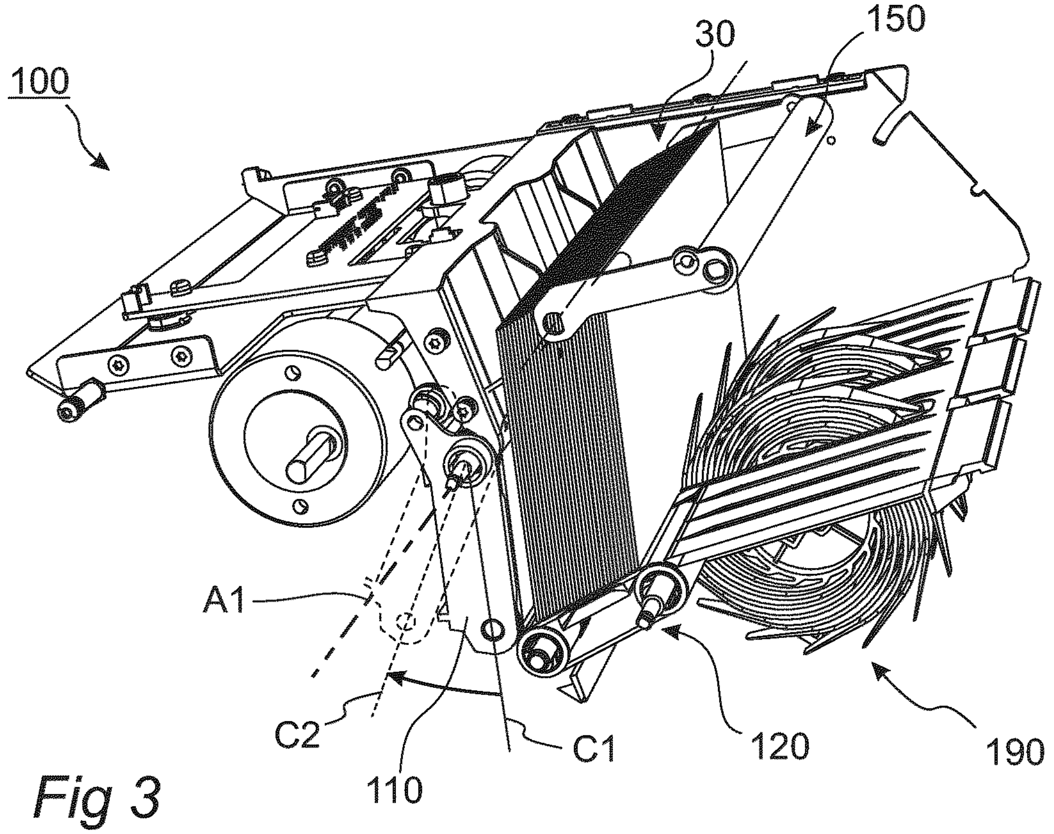
FIG. 3 shows a perspective top view of the banknote stack transport arrangement of FIG. 1A after the stacking process has commenced.

FIG. 2 illustrates a stacking process of banknotes 20 in the temporary banknote receptacle 130 of the banknote stack transport arrangement 100. The stacking process starts with a step of rotating the banknote stacking wheel 190 in the counter clockwise direction while individual banknotes 20 are supplied to the banknote stacking wheel 190. Supplying individual banknotes to banknote stacking wheels are well known in the art, one common approach being based on a pair of oppositely arranged conveyor belts which presses individual banknotes in between them and transport the individual notes between two positions within a cash handling machine. Going back to FIG. 2, we see how a banknote stack 30 is formed within the temporary banknote receptacle 130. The banknote stack 30 is formed such that the first banknote engagement portion 116 contacts a face side 32 of the banknote stack 30 and the second banknote engagement 126 portion contacts an edge side 34 of the banknote stack 30. In FIG. 3 the banknote stack 30 has been formed and the banknote stack transport arrangement 100 is ready to transport the banknote stack 30 out from the temporary banknote receptacle 130. Also schematically illustrated in FIG. 3 are the two configurations of the first structure 110. In FIG. 3, the first structure 110 is in the closed configuration C1, at which the temporary banknote receptacle 130 is closed at its lower end by the first banknote engagement portion 116 being in contact with the second banknote engagement portion 126 at the second associated ends 114, 124 of the first 110 and second 120 structures. The dotted lines illustrate the position of the structure 110 when it has been moved to the open configuration C2 along the indicated arrow.

Figure 4A:
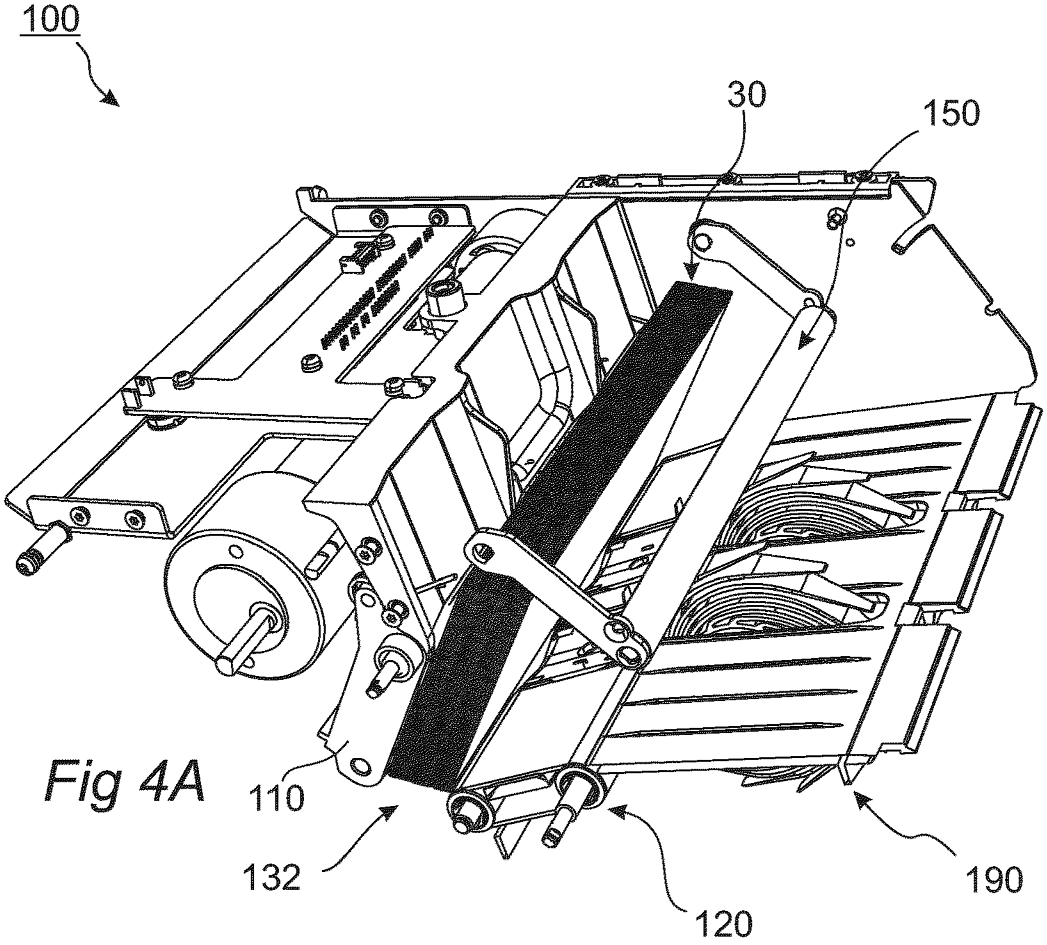
FIG. 4A shows a perspective top view of the banknote stack transport arrangement of FIG. 1A during a first phase of the process of transporting the banknote stack out from the banknote stack transport arrangement.
Figure 4B:
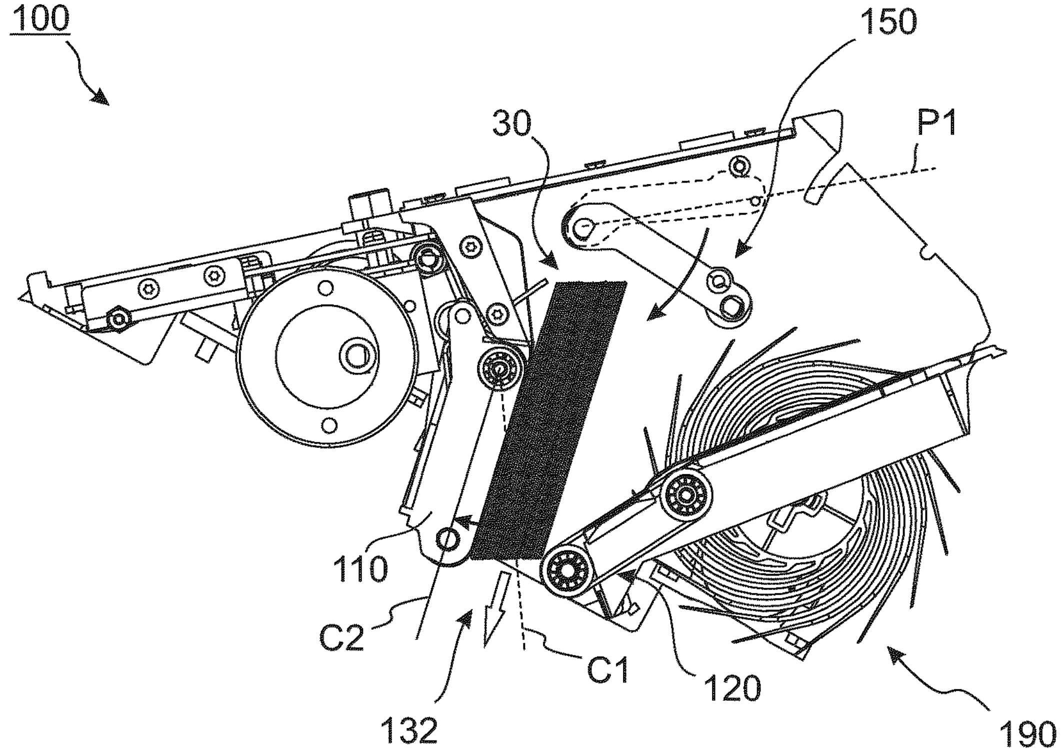
FIG. 4B shows a side view of the banknote stack transport arrangement of FIG. 4A during the first phase of transport.

The first phase of the banknote stack transport process will now be described with reference to FIGS. 4A and B. When the banknote stack 30 has been formed in the temporary banknote receptacle 130, the banknote stack transport arrangement 100 is ready to transport the banknote stack 30. Typically, the banknote stack 30 is to be transported from the banknote stack transport arrangement 100 to a cash storage compartment located under the banknote stack transport arrangement 100. As will be discussed later, such a compartment may be a safe, i.e. a locked and secured storage compartment. The banknote transport process is typically initiated in response to a signal reaching the banknote stack transport arrangement 100 from a control unit of the cash handling machine of which the arrangement 100 is part. The signal triggers the drive unit 160 to start rotating in the counter clockwise direction. This will initiate a displacement of the first 116 and second 126 banknote engagement portions in a direction towards the second associated ends 114, 124. The banknote stack 30, which resides in the temporary banknote receptacle 130, will then be forced downwards. This will in turn force the first structure 110 to move from the closed configuration C1 to the open configuration C2. In the open configuration C2, the first structure 110 has been swingably moved about the pivot axis A1 such that the first 116 and second 126 banknote engagement portions are separated from each other at the second associated ends 114, 124 so as to define an exit gap 132. The banknote stack 30 now resides in between the first 116 and second 126 banknote engagement portions and are pressed in between them at the second associated ends 114, 124. As the first 116 and second 126 banknote engagement portions continue to be displaced, the banknote stack 30 will continue its transport process out through the exit gap 132. As most clearly illustrated in FIG. 4B, the banknote engager 150, which by means of the second transmission line 180 started to move from the inactive position P1 in the direction towards the banknote stack 30 in response to the start of the drive unit 160, has now reached a position somewhere in between the inactive position and the banknote stack 30. Thus, at this stage of the transport process, the banknote engager 150 has not yet played a role in the transport process.

Figure 5A:
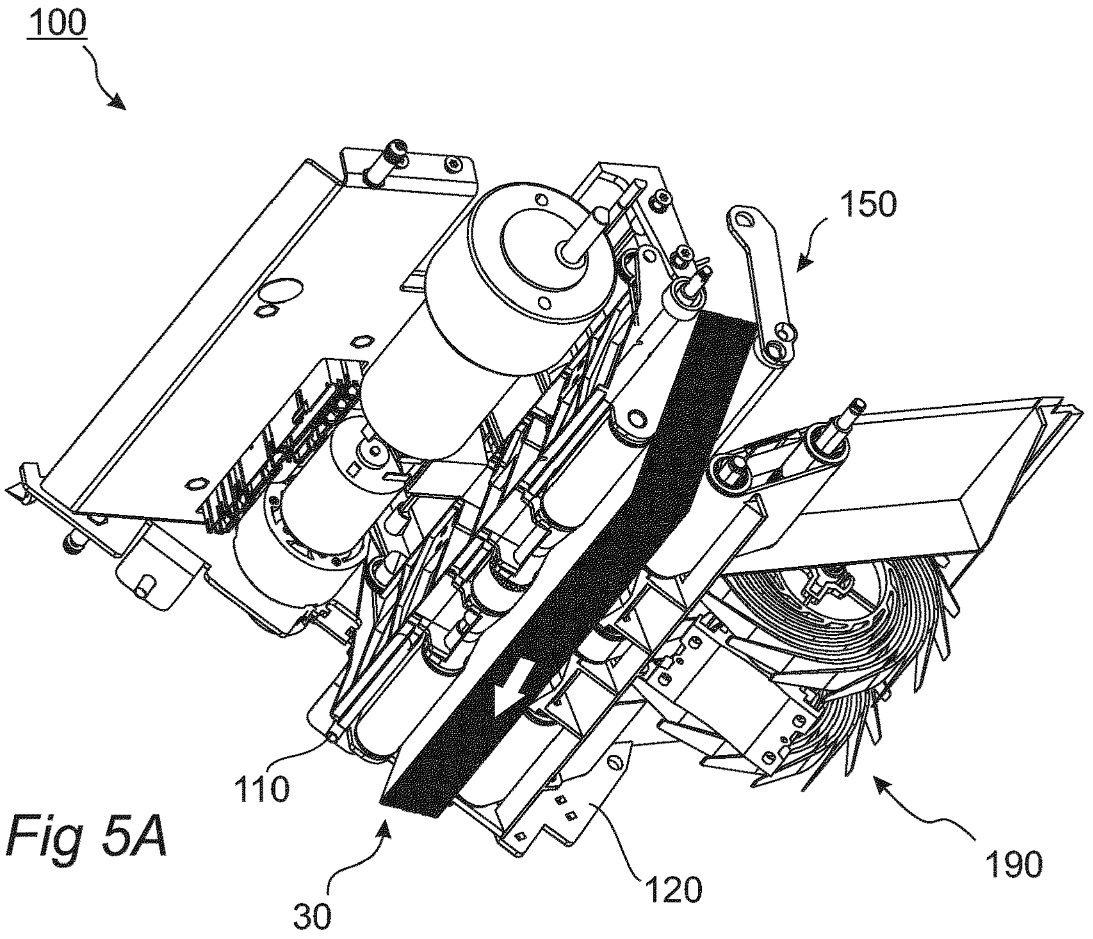
FIG. 5A shows a perspective bottom view of the banknote stack transport arrangement of FIG. 1A during a second phase of the process of transporting the banknote stack out from the banknote stack transport arrangement.
Figure 5B:
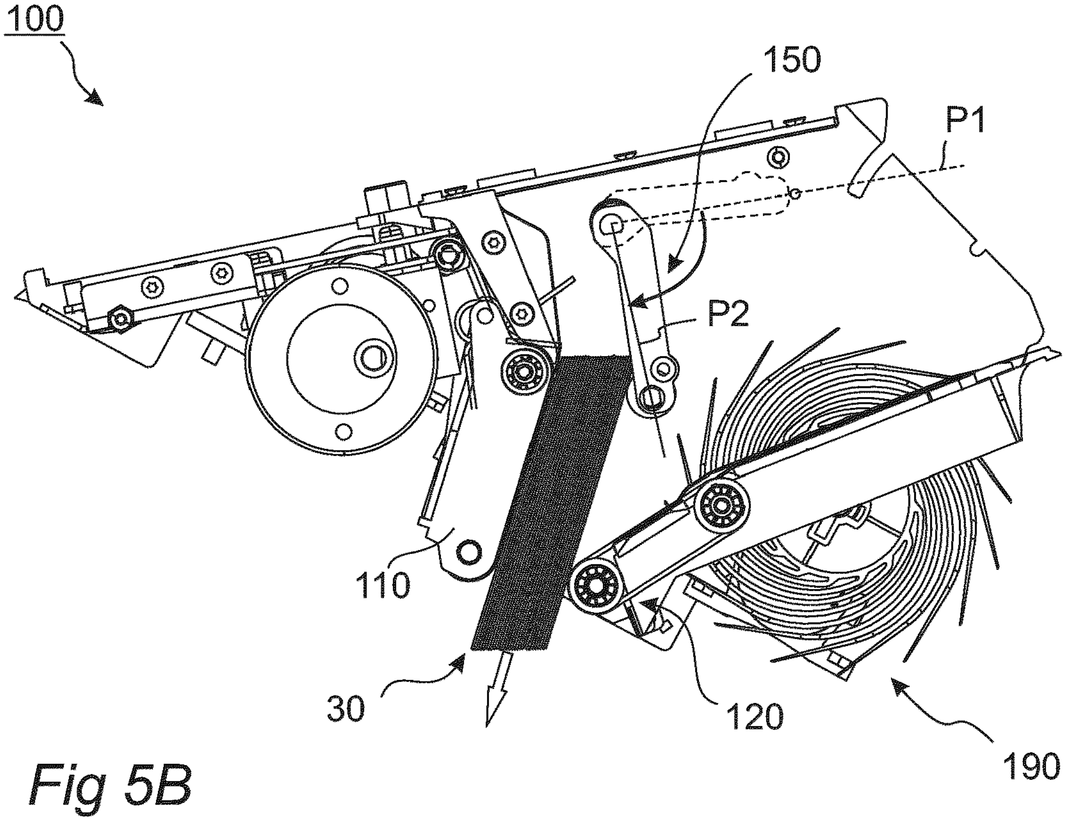
FIG. 5B shows a side view of the banknote stack transport arrangement of FIG. 5A during the second phase of transport.

FIGS. 5A and B illustrates the next step of the banknote stack transport process. Here, the banknote stack 30 has been transported about ⅓ through the exit gap 132. At this point in time, the banknote engager 150 has finally reached the active position P2 at which it is configured to press the banknote stack 30 towards the first and/or the second banknote engagement portion 116 (In the example illustrated in FIGS. 5A and B, the banknote engager 150 only presses the banknote stack 30 towards the first banknote engagement portion 116). This facilitates the banknote stack transport process, as it enables the banknote stack 30 to keep together in a stack formation, and, further, to increase the frictional forces between the banknote stack 30 and the first banknote engagement portion 116. Although not shown in the drawings, the banknote engager 150 may be configured to press the banknote stack 30 towards the second banknote engagement portion 126. This implies that the active position may be defined in relation to the second banknote engagement portion 126 instead of the first banknote engagement portion 116. This may for example occur when one or more banknotes 20 have been disorderly arranged in the temporary banknote receptacle 130 such that they predominately rest on the second banknote engagement portion 126 instead of the first banknote engagement portion 116. By allowing the banknote engager 150 to press the banknote stack 30 towards the second banknote engagement portion 126, it may be easier to transport the one or more banknotes 20 out from the temporary banknote receptacle 130.

As can be understood by the person skilled in the art, the banknote stack transport arrangement 100 of the disclosure hence is configured to transport the banknote stack 30 out from the temporary banknote receptacle 130 via the exit gap 132 by displacing said first 116 and second 126 banknote engagement portions in relation to said first 110 and second 120 structures and by moving the banknote engager 150 to the active position P2. As readily appreciated by the person skilled in the art, displacing the first 116 and second 126 banknote engagement portions in relation to the first 110 and second 120 structures may be sufficient to transport the banknote stack 30 out from the temporary banknote receptacle 130. The displacement will force the banknote stack 30 towards a bottom of the temporary banknote receptacle 130 (i.e. at the second associated ends 114, 124 of the first 110 and second 120 structures). The force from the banknote stack 30 will force the first 110 structure to distance itself from the second structure 120 from at their second associated ends 114, 124, thereby forming the exit gap 132 for allowing the banknote stack 30 to leave the temporary banknote receptacle 130. There may however be situations where the displacement of the first 110 and second 120 banknote engagement portions is not enough for transporting the banknote stack 30 out from the temporary banknote receptacle 130. Typically, such situations occur when the banknote stack 30 includes few banknotes 20 and/or the banknotes 20 of the stack 30 are not correctly aligned in the temporary banknote receptacle 130, and/or one or more banknotes 20 of the banknote stack 30 are damaged e.g. by folds, tears, holes and foil wear. For such situations, the banknote engager 150 may aid in the transport process by pressing the banknote stack 30 towards the first banknote engagement portion 116, thereby reducing the risk that one or more banknotes of the banknote stack 30 are prevented from being transported out from the temporary banknote receptacle 130.

Typically, the banknote stack transport arrangement 100 is configured to transport said banknote stack 30 out from the temporary banknote receptacle 130 via the exit gap 132 in one displacement operation. However, sometimes, this is not possible. There may for example be situations where one or more banknotes 20 of the stack 30 is not transported out through the exit gap 132 with the rest of the banknote stack 30. Alternatively, the banknote stack 30 may be incorrectly aligned in the temporary banknote receptacle 130. Alternatively, one or more banknotes 20 of the banknote stack 30 may be damaged e.g. by folds, tears, holes and foil wear. In such situations it may not be possible to transport the banknote stack 30 out from the temporary banknote receptacle 130 in one transport operation. Instead, the drive unit 160 may be operated in reverse, i.e. in the clockwise direction, forcing the banknote engager 150 to move backwards in the direction of the inactive position P1 and hence loosen its grip of the banknote stack 30. At the same time, displacement of the first 116 and second 126 banknote engagement portions ceases, as a result from the one-way clutch bearings 173*a*, 174*a* preventing the drive unit 160 to reverse the displacement direction of the first 116 and second 126 banknote engagement portions. If the drive unit 160 is then yet again operated in the counter clockwise direction, displacement of the first 116 and second 126 banknote engagement portions is yet again initiated and the banknote engager 150 is moved to the active position P2. It has been seen that this iterative process will for most cases ultimately result in all banknotes 20 of the banknote stack 30 being transported out from the temporary banknote receptacle 130.

Figure 6:
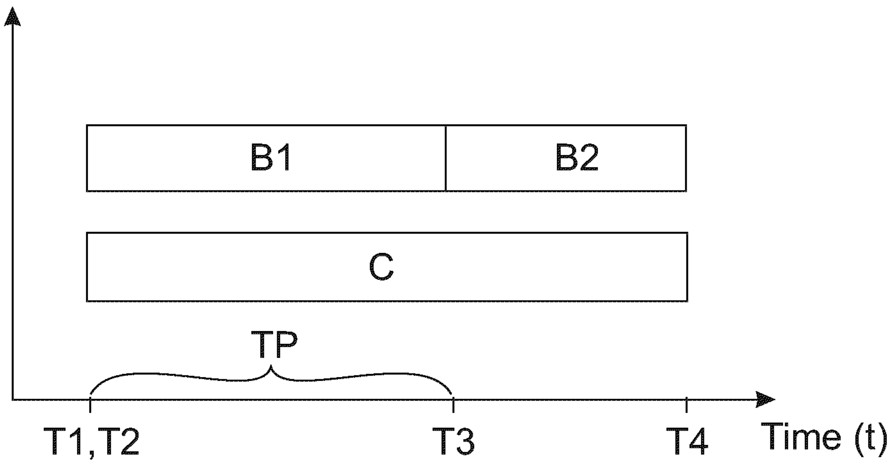
FIG. 6 shows a timing diagram illustrating the initiation of the displacing of the first and second banknote engagement portions in relation to the initiation of the moving of the banknote engager for the example embodiment of FIGS. 1A-D.

One intrinsic feature of the present example embodiment of the arrangement is that the banknote engager 150 reaches the active position P2 after the first 116 and second 126 banknote engagement portions has already displaced the banknote stack 30 at least partly out from the exit gap 132. This is illustrated in the timing diagram of FIG. 6. The banknote stack transport arrangement 100 is configured to initiate the displacing of said first 116 and second 126 banknote engagement portions at a first time position T1, and initiate the moving of the banknote engager 150 at a second time position T2, wherein said first T1 and second T2 time positions relates to each other such that said displacing of said first 116 and second 126 banknote engagement portions has been ongoing for a time period TP when the banknote engager 150 reaches the active position P2. As can be seen in FIG. 6, the first 116 and second 126 banknote engagement portions are displacing from the first time position T1 until a fourth time position T4. This is illustrated in FIG. 6 by time block C. The banknote engager 150 will start its movement from the inactive position P1 towards the active position P2 at the second time position T2 but will not reach the active position P2 until a third time position T3. This time of banknote engager movement is illustrated in FIG. 6 by time block B1. The banknote engager 150 will then remain in the active position P2 as long as the drive unit 160 operates the banknote stack transport arrangement 100. This lasts until the fourth time position T4. The time block B2 marks the time period during which the banknote engager 150 is in the active position P2. For the example embodiment, the time period TP is achieved even if the first time position T1 and the second time position T2 occurs simultaneously or substantially simultaneously, as indicated in FIG. 6. The reason for this is that the example embodiment utilizes a built-in mechanical delay, as has been described already with reference to FIGS. 1A-D. It should be understood that the banknote stack transport arrangement of the disclosure is not limited to this particular embodiment, and that other means of achieving said time period is equally applicable within the scope of the claims. One such alternative example embodiment could have separate drive mechanisms and drive units which could be operated by the control unit to initiate displacement and movement at different respective time positions.

Figure 7:
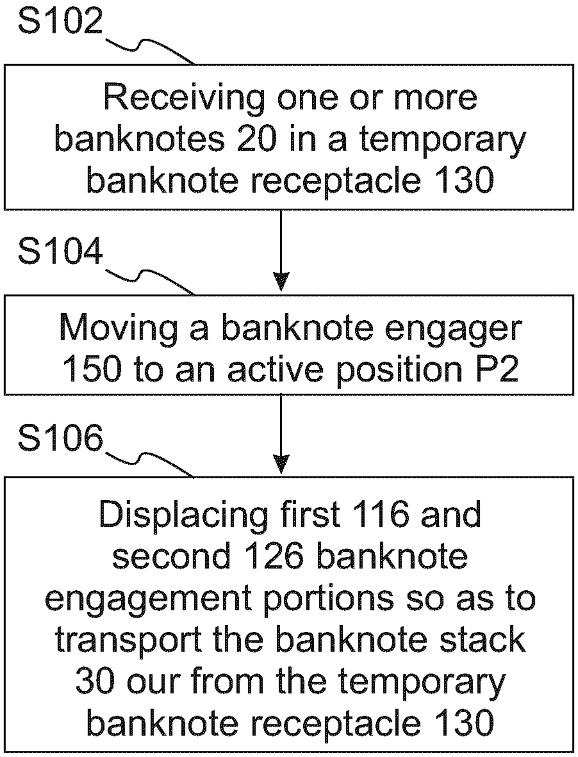
FIG. 7 shows a flow chart of a method according to an example embodiment of the disclosure.

A method for transporting one or more banknotes inside a cash handling machine 10 will now be described with reference to FIG. 7. Much of the details has already been described in detail hereinabove and the method will thus be described only in brief. The cash handling machine 10 comprises a first structure 110 having first 112 and second 114 ends and presenting a first banknote engagement portion 116 being displaceable in relation to the first structure 110; a second structure 120 having first 122 and second 124 ends and presenting a second banknote engagement portion 126 being displaceable in relation to the second structure 120; said first 110 and second 120 structures being arranged such that said first 116 and second 126 banknote engagement portions are distanced from each other at the first associated ends 112, 122 for allowing one or more banknotes 20 to enter in between the portions, wherein at least one of the first 110 and second 120 structures is pivotally arranged at its first end 112 so as to be swingably movable.

The method comprises the step of receiving S102, when said at least one of the first 110 and second 120 structures is in a closed configuration C1 at which the first 116 and second 126 banknote engagement portions are in contact with each other at the second associated ends 114, 124 so as to form at least a bottom part of a temporary banknote receptacle 130: one or more banknotes 20 in the temporary banknote receptacle 130 and supporting a formation of a banknote stack 30 therein such that the first banknote engagement portion 116 contacts a face side 32 of the banknote stack 30 and the second banknote engagement portion 126 contacts an edge side 34 of the banknote stack 30.

The method further comprises the step of moving S104 a banknote engager 150 of the cash handling machine 10 to an active position P2 at which the banknote engager 150 is configured to press the banknote stack 30 towards the first banknote engagement portion 116.

The method further comprises the step of displacing S106 said first 116 and second 126 banknote engagement portions in relation to said first 110 and second 120 structures so as to transport, when said at least one of the first 110 and second 120 structures is in an open configuration C2 at which the first 116 and second 126 banknote engagement portions are separated from each other at the second associated ends 114, 124 so as to define an exit gap 132, the banknote stack 30 out from the temporary banknote receptacle 130 via the exit gap 132.

The step of displacing said first 116 and second 126 banknote engagement portions may be initiated at a first time position T1, and the step of moving of the banknote engager 150 may be initiated at a second time position T2, wherein said first and second time positions relates to each other such that said displacing of said first and second banknote engagement portions has been ongoing for a time period TP when the banknote engager 150 reaches the active position P2.

Figure 8A:
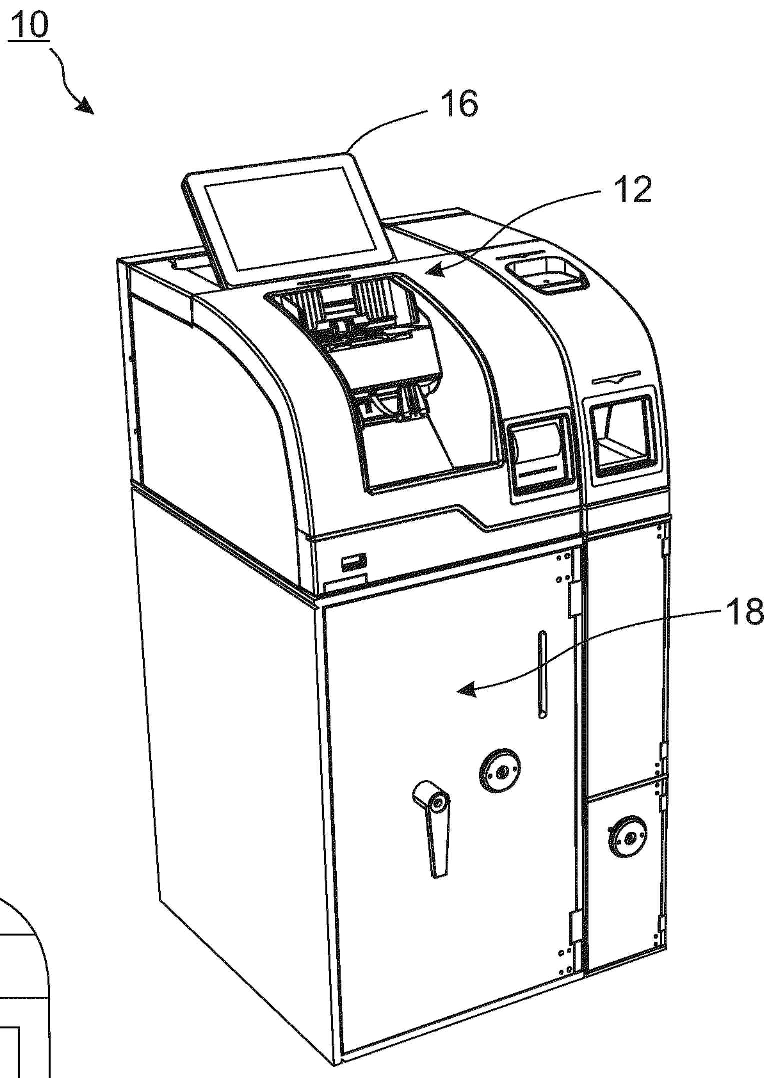
FIG. 8A shows a perspective view of a cash handling machine according to an example embodiment of the disclosure.
Figure 8B:
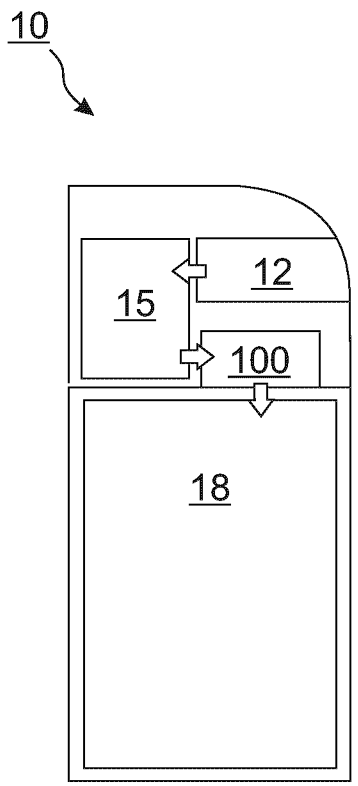
FIG. 8B shows a schematic side view of a cash handling machine of FIG. 8A.

FIGS. 8A and B illustrates a cash handling machine 10 according to an embodiment of the disclosure. The cash handling machine 10 is of a kind usually used for depositing large amounts of cash by personnel for example in stores and financial establishments. The user may enter cash and deposit the cash value electronically to his or her account. The cash is physically transported by the cash handling machine 10 to a storage compartment of the machine.

The cash handling machine 10 of the example embodiment comprises a banknote input unit 12 for allowing a user to input one or more banknotes 20. The user operates the cash handling machine 10 by inputting commands and instructions via an operating interface 16. In response to specific user instructions, the one or more banknotes 20 are transported internally within the machine 10 to a banknote counting and counterfeit determination unit 15 within which the banknotes 20 are counted and investigated to assess if they are genuine or counterfeit. After this process, the one or more banknotes 20 are transported to a banknote stack transport arrangement 100 configured to receive said one or more banknotes 20 and transport the same into a safe 18. The safe 18 is located below the features described already, and the banknote stack transport arrangement 100 may thus transport the one or more banknotes 20 by allowing them to fall into the safe 18 by gravity. The safe 18 may comprise a dedicated storage compartment, such as a heat-sealable cash bag, a canvas bag or a banknote cassette (not shown). Cash handling machines of this kind typically have different access levels or rights. Typically, the safe 18 is not accessible by the users depositing their banknotes 20, which users merely have a limited access to the upper parts of the machine 10. The safe 18 is instead typically maintained by cash-in-transit (CIT) personnel who have full access to the machine 10, including the safe 18. One embodiment of the banknote stack transport arrangement 100 has been described hereinabove. However, the cash handling machine may comprise also other embodiments of the banknote stack transport arrangement within the scope of the appended claims.

The person skilled in the art realizes that the present disclosure by no means is limited to the preferred embodiments described above. On the contrary, many modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A banknote stack transport arrangement for a cash handling machine, comprising:

a first structure having first and second ends and presenting a first banknote engagement portion being displaceable in relation to the first structure;

a second structure having first and second ends and presenting a second banknote engagement portion being displaceable in relation to the second structure;

the first and the second structures being arranged such that the first and the second banknote engagement portions are distanced from each other at the first associated ends for allowing one or more banknotes to enter in between the banknote engagement portions, wherein at least one of the first and the second structures is pivotally arranged at its first end so as to be swingably movable between:

a closed configuration at which the first and the second banknote engagement portions are in contact with each other at the second associated ends such that they together form at least a bottom part of a temporary banknote receptacle configured to receive the one or more banknotes and support a formation of a banknote stack therein, such that the first banknote engagement portion contacts a face side of the banknote stack and the second banknote engagement portion contacts an edge side of the banknote stack; and an open configuration at which the first and the second banknote engagement portions are separated from each other at the second associated ends so as to define an exit gap; and a banknote engager movable between an inactive position and an active position, at which active position the banknote engager is configured to press the banknote stack towards the first and/or the second banknote engagement portion;

wherein the banknote stack transport arrangement is configured to transport the banknote stack out from the temporary banknote receptacle via the exit gap by displacing the first and the second banknote engagement portions in relation to the first and the second structures and by moving the banknote engager to the active position.

2. The banknote stack transport arrangement according to claim 1, wherein the banknote stack transport arrangement is configured to transport the banknote stack out from the temporary banknote receptacle via the exit gap in one displacement operation.

3. The banknote stack transport arrangement according to claim 1, wherein the second structure is fixedly arranged in the banknote transport arrangement.

4. The banknote stack transport arrangement according to claim 1, wherein each of the first and the second banknote engagement portions is defined by one or more conveyor belts.

5. The banknote stack transport arrangement according to claim 1, wherein the first and the second structures are biased towards each other to the closed configuration.

6. The banknote stack transport arrangement according to claim 1, wherein the banknote engager extends from a fixed end at which the banknote engager is pivotally arranged, to a free end which presents an engaging surface configured to be in contact with the banknote stack for pressing the banknote stack towards the first and/or the second banknote engagement portion when the banknote engager is in the active position.

7. The banknote stack transport arrangement according to claim 6, wherein the banknote engager comprises one or more engaging elements arranged at the free end, wherein the one or more engaging elements together define the engaging surface.

8. The banknote stack transport arrangement according to claim 1, wherein the banknote stack transport arrangement is configured to:

initiate the displacing of the first and the second banknote engagement portions at a first time position, and initiate the moving of the banknote engager at a second time position, wherein the first and the second time positions relate to each other such that the displacing of the first and the second banknote engagement portions has been ongoing for a time period when the banknote engager reaches the active position.

9. The banknote stack transport arrangement according to claim 1, wherein the banknote transport arrangement further comprises a drive unit configured to, via a drive mechanism, provide kinetic energy to the first and the second structures for displacing the first and the second banknote engagement portions.

10. The banknote stack transport arrangement according to claim 9, wherein the drive unit is further configured to, via the drive mechanism, move the banknote engager between the inactive and the active positions.

11. The banknote stack transport arrangement according to claim 9, wherein the drive unit is an electric motor; and wherein the drive mechanism is configured such that kinetic energy is provided to the first and the second banknote engagement portions only for one rotational direction of the drive unit, such that the first and the second banknote engagement portions are only displaceable in a direction towards the exit gap.

12. The banknote stack transport arrangement according to claim 1, wherein the banknote transport arrangement further comprises a banknote stacking wheel configured to receive the one or more banknotes, move the one or more banknotes into the temporary banknote receptacle, and form the banknote stack therein.

13. A cash handling machine comprising:

a banknote input unit for allowing a user to input one or more banknotes;

a safe for storing the one or more banknotes; and a banknote stack transport arrangement according to claim 1; wherein the banknote transport arrangement is configured to receive the one or more banknotes and transport the same into the safe.

14. A method for transporting one or more banknotes inside a cash handling machine, wherein the cash handling machine comprises:

a first structure having first and second ends and presenting a first banknote engagement portion being displaceable in relation to the first structure;

a second structure having first and second ends and presenting a second banknote engagement portion being displaceable in relation to the second structure;

the first and the second structures being arranged such that the first and the second banknote engagement portions are distanced from each other at the first associated ends for allowing one or more banknotes to enter in between the banknote engagement portions, wherein at least one of the first and the second structures is pivotally arranged at its first end so as to be swingably movable, the method comprising:

receiving, when the at least one of the first and the second structures is in a closed configuration at which the first and the second banknote engagement portions are in contact with each other at the second associated ends so as to form at least a bottom part of a temporary banknote receptacle, one or more banknotes in the temporary banknote receptacle and supporting a formation of a banknote stack therein such that the first banknote engagement portion contacts a face side of the banknote stack and the second banknote engagement portion contacts an edge side of the banknote stack;

moving a banknote engager of the cash handling machine to an active position at which the banknote engager is configured to press the banknote stack towards the first and/or the second banknote engagement portion; and displacing the first and the second banknote engagement portions in relation to the first and the second structures so as to transport, when the at least one of the first and the second structures is in an open configuration at which the first and the second banknote engagement portions are separated from each other at the second associated ends so as to define an exit gap, the banknote stack out from the temporary banknote receptacle via the exit gap.

15. The method according to claim 14, wherein the step of displacing the first and the second banknote engagement portions is initiated at a first time position, and wherein the step of moving the banknote engager is initiated at a second time position; and wherein the first and the second time positions relate to each other such that the displacing of the first and the second banknote engagement portions has been ongoing for a time period when the banknote engager reaches the active position.

* * * * *